United States Patent [19]

Steele

[11] Patent Number: 4,564,834
[45] Date of Patent: Jan. 14, 1986

[54] THERMAL LIQUID LEVEL DETECTOR

[75] Inventor: Robert E. Steele, Cortland, Ohio

[73] Assignee: General Motors Corporation, Detroit, Mich.

[21] Appl. No.: 540,654

[22] Filed: Oct. 11, 1983

[51] Int. Cl.⁴ ..................... G01F 23/00; H01H 35/18
[52] U.S. Cl. ..................... 340/622; 73/295;
   137/392; 307/118; 307/310; 340/59; 361/178
[58] Field of Search ............ 340/622, 59; 73/295;
   374/142, 144, 148; 137/392; 361/178; 307/118, 310

[56] References Cited

U.S. PATENT DOCUMENTS

| | | | |
|---|---|---|---|
| 3,281,815 | 10/1966 | Oster | 340/622 X |
| 3,350,710 | 10/1967 | Bridges | 340/622 X |
| 3,408,940 | 11/1968 | McGrogan | 137/392 X |
| 3,500,687 | 3/1970 | Smith | 73/295 |
| 3,600,946 | 8/1971 | Ziemba et al. | 340/622 X |
| 3,686,517 | 8/1972 | Sexton, Jr. | 307/310 |
| 3,755,801 | 8/1973 | Milo | 340/622 |
| 3,846,776 | 11/1974 | Kahn | 73/295 X |
| 3,863,210 | 1/1975 | Roland et al. | 340/622 X |
| 3,882,728 | 5/1975 | Wittlinger | 307/310 X |
| 3,937,989 | 2/1976 | Meijer | 307/310 X |
| 3,950,991 | 4/1976 | Grass | 307/310 X |
| 3,992,667 | 11/1976 | Finger | 340/622 X |
| 4,003,038 | 1/1977 | Meijer | 340/622 X |
| 4,053,874 | 10/1977 | Glaser | 307/118 X |
| 4,319,233 | 3/1982 | Matsuoka et al. | 73/295 X |
| 4,392,782 | 7/1983 | Kuehn, III et al. | 307/118 X |

FOREIGN PATENT DOCUMENTS 2821035 11/1979 Fed. Rep. of Germany ...... 340/622
WO83/00765 3/1983 PCT Int'l Appl. ................. 340/622

OTHER PUBLICATIONS

"Automatic Liquid Level Controller Uses IC Timer", *Electronic Engineering*, Oct. 1977, p. 20.

Primary Examiner—James L. Rowland
Assistant Examiner—Thomas J. Mullen, Jr.
Attorney, Agent, or Firm—Warren D. Hill

[57] ABSTRACT

A pair of PTC elements, preferably of the barium titanate variety, are mounted in a container to sense liquid level, for example oil level in an engine crankcase. The elements have the same resistance, mass and switching point but different thermal loss coefficients which have one value in air and another in liquid. In one embodiment, the elements are both positioned at the set liquid level and are electrically energized at the same moment. When the elements are in liquid, one of them will heat to the switch point before the other and change to a much higher resistance. When the elements are in air, the other element reaches the switch point first. When the elements are connected in series across a power source, the switching causes the circuit to latch in that state even though the liquid level condition changes. The junction of the elements provides a convenient signal output indicating liquid level. In a second embodiment, one PTC element is at the set liquid level and the other is in air above that level. Again, the liquid level determines which PTC element wins the race when electrically energized.

6 Claims, 12 Drawing Figures

THERMAL LIQUID LEVEL DETECTOR

This invention relates to liquid level detection apparatus and, particularly, to such apparatus using thermal detectors sensitive to the presence of liquid.

Thermal sensors have previously been proposed for detecting liquid level. Such sensors are heated indirectly or directly by passing an electrical current therethrough and their electrical resistance or some other property varies according to its temperature. Since the device loses heat at a rate depending on the medium in which it is immersed, e.g., liquid or air, as well as the temperature of the medium, a system can be devised to monitor the resistance or other temperature dependent property of the device to determine whether the device is immersed in liquid or air. Liquid level detection circuits using one thermal element to detect a liquid level have been used. These have been successful for some applications but not others. For example, in the measurement of oil level in the crankcase of an engine, there is a problem of distinguishing between cold oil and warm air since both have a similar effect on the thermal sensor, and the addition of some device to adjust for the temperature of the ambient air is required. In addition, it is desirable to measure the engine oil level in the brief period between actuating the engine ignition and the decrease in oil level caused by engine operation. Then once the measurement is made, a provision must be made to continue signaling an indication of the initial oil level during engine operation.

It is therefore a general object of this invention to provide a thermal liquid level sensor useful in wide temperature ranges. It is a further object to provide such a sensor which causes a continued indication of high liquid level when the initial liquid level is sufficient to immerse the sensor or otherwise provide a low level indication.

The invention is carried out by providing two thermal sensors in the form of positive temperature coefficient elements which have a switching point to a high resistance at the same temperature and also have substantially the same resistance and mass but different temperature loss coefficients which vary when immersed in liquid or air such that at high liquid levels, one of the elements will reach a switch temperature sooner than the other to provide a high level signal, and at low levels the other element will reach a switch temperature first to provide a low level signal. The invention contemplates that the PTC elements will be so connected to produce a voltage signal dependent on the liquid level and further, when one element switches to a high resistance, the circuit latches to maintain that condition and thereby maintain a high or low voltage signal.

The above and other advantages will become more apparent from the following specification taken in conjunction with the accompanying drawings, wherein like reference numerals refer to like parts, and wherein.

Figure 9:
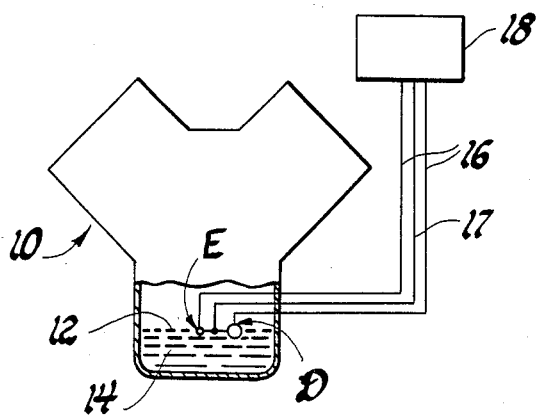
FIG. 9 is a diagrammatic view of an engine containing thermal sensors according to a second embodiment of the invention and a liquid level detection circuit coupled thereto.
Figure 10:
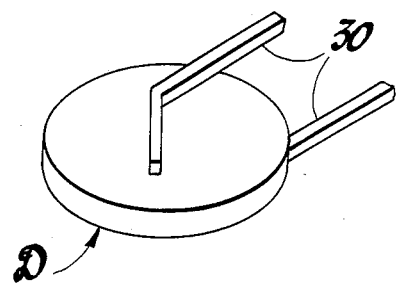
Figure 11:
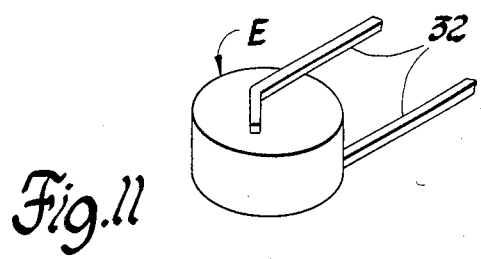
Figure 12:
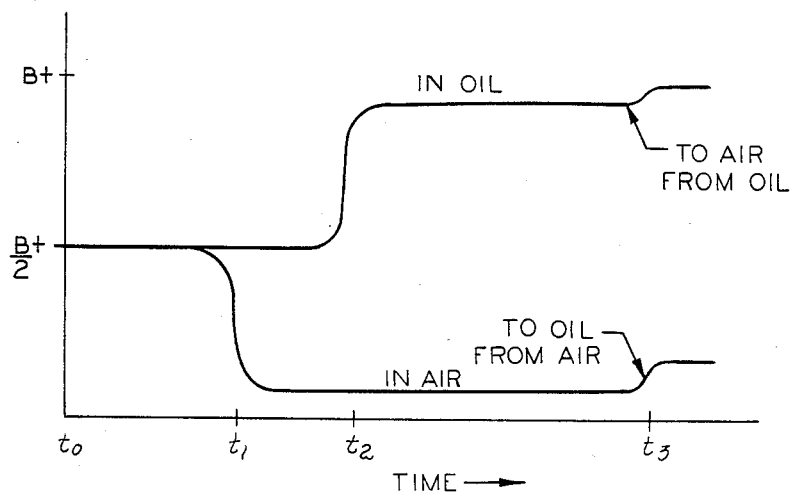

FIGS. 10 and 11 contain isometric views of the two thermal sensors of FIG. 9 revealing relative sizes thereof; and FIG. 12 is a diagram showing the voltage change at the junction of the thermal sensors of FIG. 9 for the cases of high liquid level and low liquid level.

A liquid level detection arrangement according to this invention uses sensors comprising positive temperature coefficient resistors known as PTC elements. The PTC elements are characterized by a resistance at one temperature, say room temperature, and as the temperature is increased to a critical temperature called a switch point, the resistance increases markedly so that when incorporated in a circuit, a voltage or a current in the circuit will also change at the switch point thereby giving an indication that the resistance change has occurred. There are various types of PTC resistors such as polymer compositions and barium titanate. While the polymer compositions exhibit substantial hysteresis in their resistance curves, the barium titanate PTC elements do not and, thus, the latter are preferred for the applications described below. In these applications, two PTC elements are used, both having the same mass and resistance as well as switch point and are connected to circuit so a to be heated by current flowing through the bodies of the PTC elements. Consequently, when the same current is applied through both PTC elements, an equal amount of power will be dissipated within them. The elements are, however, designed so that the thermal loss to the surrounding medium is different for each element and depends upon the nature of the medium. Thus, when a current is applied to the PTC elements, both of them will be heated but one will reach the switch point before the other due to the difference in thermal loss rate. The determination of which PTC element will "win the race" depends on the liquid level, that is, whether one or both of the PTC elements is immersed in liquid.

Figure 1:
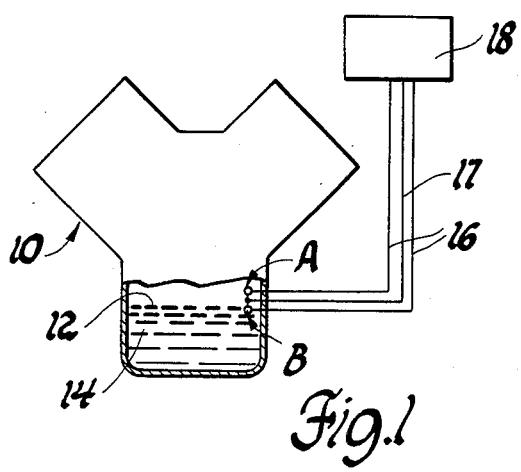
FIG. 1 is a diagrammatic view of an internal combustion engine having a crankcase containing thermal sensors according to the invention and a detection circuit coupled to the sensors.
Figure 2:
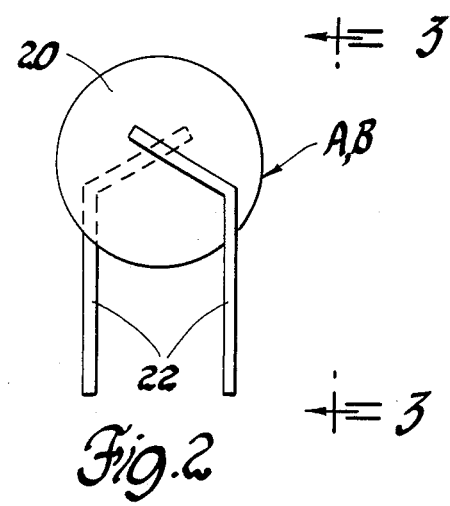
FIGS. 2 and 3 are front and side views, respectively, of a PTC sensor according to the invention.
Figure 3:
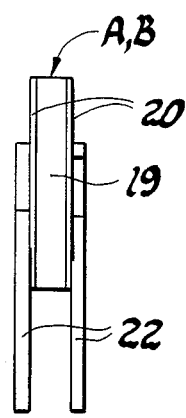
Figure 4:
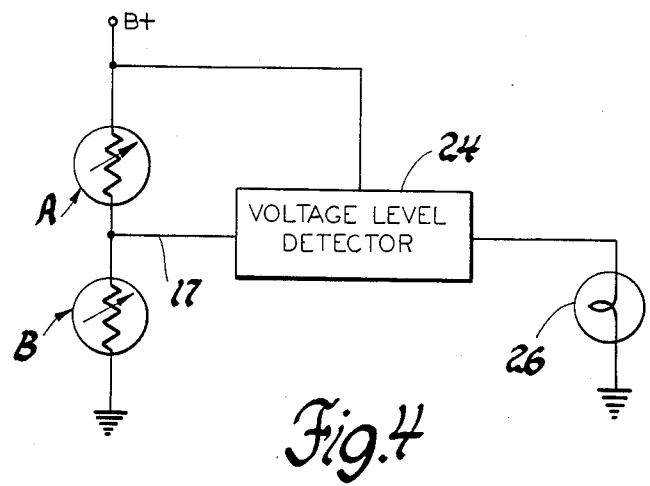
FIG. 4 is a schematic circuit diagram of a liquid level detection circuit containing PTC sensors according to the invention.

FIG. 1 depicts an internal combustion engine 10, filled to some normal level or critical level 12 with oil 14. A PTC element A is located above the oil level 12 and a PTC element B is located below the level 12 so that it is immersed in oil when the oil is at the desired level 12. The elements A and B are electrically connected and their connection point is coupled by a conductor 17 to an indication circuit 18 and the other side of the elements A and B are connected by conductors 16 to the circuit 18. As shown in FIGS. 2 and 3, the PTC elements A and B each comprise a disc 19 of barium titanate having dimensions on the order of 0.2 inches diameter and 0.05 inches thickness. Each face of the disc is covered with a thin copper-tin coating 20 to which conductive leads 22 are soldered. The thermal loss coefficient of the device depends upon the surface area of the device, the medium in which it is immersed and also the conductivity of the leads. In the present case, the devices A and B have the same surface area, the PTC device A has copper leads and the device B has steel leads so that the device A which is always in air has a thermal loss coefficient ($K_{DC}$) which is intermediate the $K_{DC}$ values of the device B in air and in oil. Both devices have a switch temperature of 160° C., and a resistance at 25° C. of 25 ohms. The element A has $K_{DC}$ in air of about 11 MW/°C. while the corresponding value for device B is 3 MW/°C. in air and 19 MW/°C. in oil. As shown in FIG. 4, the device A and B are serially connected between a power supply B+ and ground having a common connection point as an output lead 17 connected to a voltage level detector 24 which selectively supplies current through a lamp 26 to ground. The voltage level detector 24 senses when the voltage on line 17 reaches a high value at low oil level conditions and illuminates the warning lamp 26, whereas when the voltage signal on line 17 is at a lower value, the lamp 26 is not illuminated.

Figure 5:
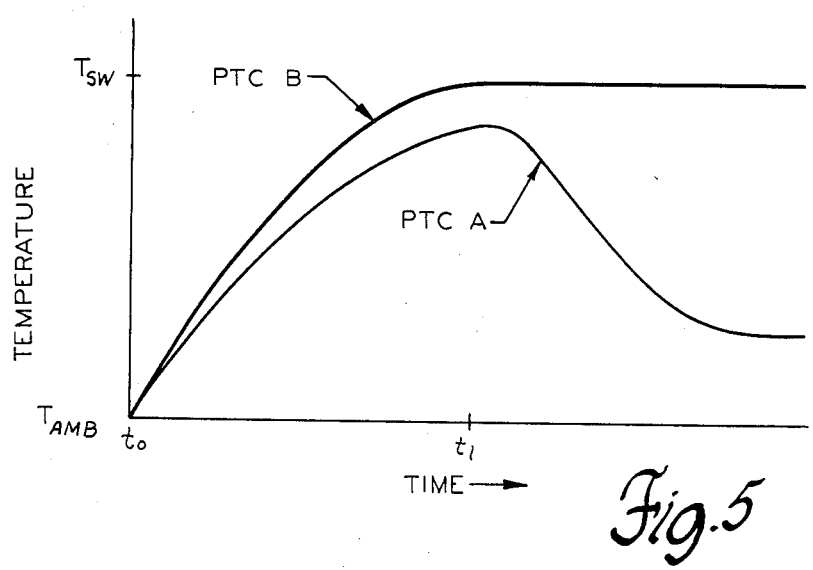
FIG. 5 is a diagram illustrating the change of temperature with time of the PTC sensors of FIG. 1 for a low liquid level condition.
Figure 6:
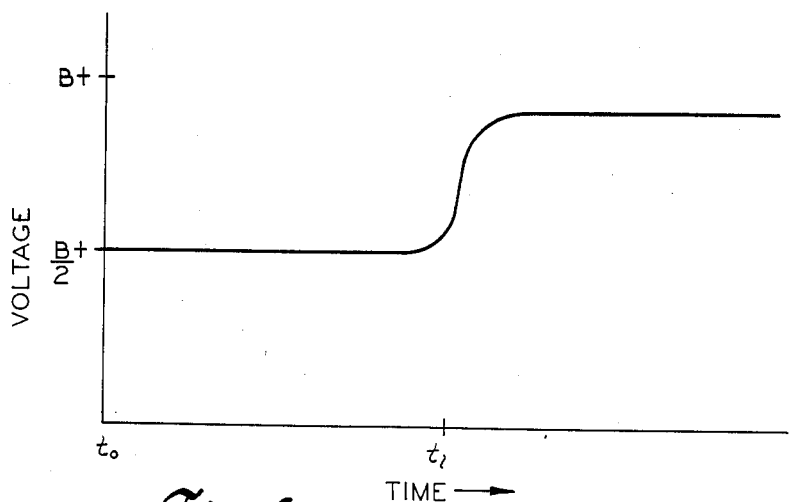
FIG. 6 is a diagram showing the change of voltage at the junction of the PTC sensors of FIG. 1 for a low liquid level condition.

FIG. 5 shows the temperature response of the devices A and B with time when both devices are in air corresponding to a low liquid level. Since engine oil level is measured at the quiescent level which is obtained when the engine is not running, the level detection is made as soon as the ignition is energized at time $t_0$ and before the engine operation causes the oil to decrease from the quiescent level. Thus, beginning at time $t_0$, the ignition circuit energizes the power supply B+ and both PTC elements A and B increases in temperature since the elements are in series circuit and share the same heating current. They have the same amount of energy dissipated within but because the heat loss rate is greater for element A its temperature increases at a lower rate. Consequently, at time $t_1$, the element B reaches a switching temperature while element A has not attained that point. Then the increase of resistance in element B causes the heating current to diminish substantially. The current is sufficient to sustain the element B at its switch point or above, but element A, because of its higher losses, then decreases in temperature and reaches a steady state at a lower value. FIG. 6 depicts the voltage occurring at line 17 of FIG. 4 under the conditions of FIG. 5. The voltage is initially at $B+/2$ since the resistors have equal value at ambient temperature. However, when the PTC element B reaches its switch point $t_1$ and increases greatly in value, the voltage at line 17 also increases substantially thereby providing an output indication on line 17 which is readily recognized by the voltage level detector 24 to effect illumination of the lamp 26.

Figure 7:
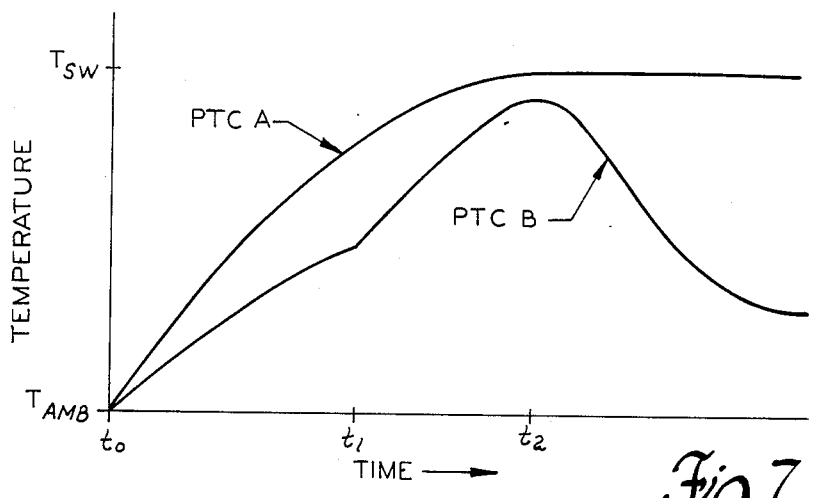
FIG. 7 is a temperature vs. time diagram for the PTC sensors of FIG. 1 for a high liquid level condition.
Figure 8:
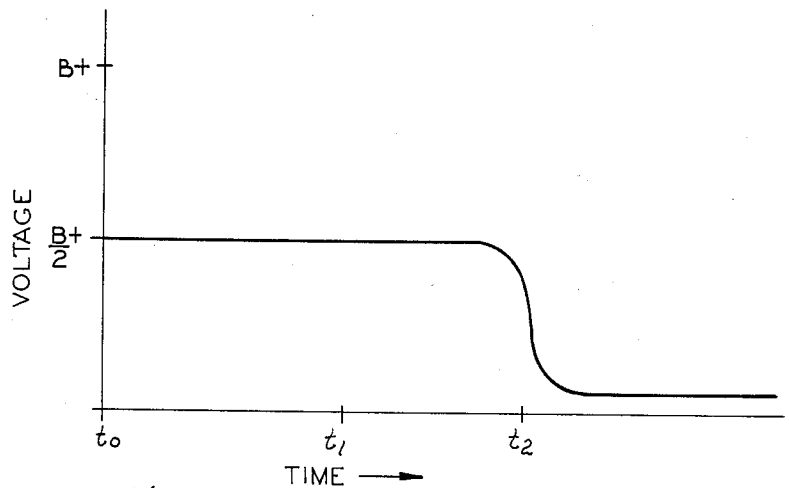
FIG. 8 is a voltage diagram depicting voltage levels at the junction of the PTC devices of FIG. 1 corresponding to the temperature changes of FIG. 7.

FIG. 7 shows the resistance dynamics of the elements when the PTC element B is immersed in oil until time $t_1$ and then due to decreasing oil level upon engine operation, the element B is in air after $t_1$. With element B initially in oil, its heat loss is greater than that of element A so that the temperature in element A rises at a greater rate and wins the race to switch point even though at time $t_1$, the element B is in air and begins to heat more rapidly. But element A, because of its head start, wins the race thereby increasing in its resistance when it reaches a switch point at $t_2$, thereby causing the voltage at line 17 to drop substantially as shown in FIG. 8. The voltage level detector 24 does not respond to the voltage drop and the lamp 26 is not illuminated. The circuit is latched in this state due to the dominant higher temperature of the PTC element A so long as the circuit is energized.

FIG. 9 depicts a second embodiment of the invention wherein the engine 10 contains two PTC elements D and E both at the same horizontal position at the desired level 12 of the oil so that they will both be immersed in oil or they will both be in air. The elements D and E are connected serially in circuit with the common connection on line 17 providing a voltage output. In essence, the circuit of FIG. 4 applies to the second embodiment. As shown in FIGS. 10 and 11, the PTC elements D and E have different shapes even though they contain substantially the same mass. The element D has a diameter of 0.4 inches and a thickness of 0.04 inches while the element E has a diameter of 0.25 inches and a thickness of 0.1 inches. The leads are of different composition; the element D has steel leads 30 while the element E has copper leads 32. The properties of the two PTC elements are given in the following table:

|  | PTC D | PTC E |
|---|---|---|
| AREA | .301 Sq. In. | .177 Sq. In. |
| RESISTANCE (25° C.) | 12.4Ω | 12.2Ω |
| $K_{DC}$ (AIR) | 5.56 MW/°C. | 9.09 MW/°C. |
| $K_{DC}$ (OIL) | 43.58 MW/°C. | 29.05 MW/°C. |
| SWITCH TEMP | 120° C. | 120° C. |

The thermal loss coefficient $K_{DC}$ for each element is different for both the air and oil mediums. This is due to the different surface areas and the different conductivities of the leads. In air, the lead conductivity has a greater effect on thermal loss than does the surface area so that the element E has a greater thermal loss coefficient than element D. In oil, on the other hand, the surface area is the dominating factor in determining the loss coefficient which is greater for the element D than for the element E. Thus, when the two elements are connected in series as in FIG. 4 with elements D and E in place of elements A and B, respectively, and heated by a current flowing therethrough, the element D will win the race to the switch point when they are in air but the element E will win the race when they are immersed in oil. The effect of the PTC resistance changes when both elements are in oil and in air on the voltage signal at line 17 is shown in FIG. 12. Where the circuit is actuated at time $t_0$ with the elements below the switch point the voltage is at $B+/2$. If the elements are both in air, then at time $t_1$, the element D reaches the switch point causing the voltage at line 17 to drop to a low value. The circuit is then latched in that condition; if at $t_3$ the element were immersed in oil, the voltage would increase only slightly. If on the other hand, both elements were initially in oil then at time $t_2$, the element E would reach the switch point and its resistance increase at that time would cause the voltage at line 17 to increase to a high value. Again, the circuit latches in this condition. If at time $t_3$ the medium surrounding the PTC elements changes from oil to air, then the voltage would increase slightly. In any event, the voltage level detector 24 can easily distinguish between the voltages sensed for the cases where the PTC elements are initially in air or initially in oil to illuminate the lamp 26 to give a warning when the liquid level is below the PTC elements. For this embodiment, the voltage level detector senses the low voltage to trigger the warning.

It will therefore be seen that the invention as described herein provides an inexpensive and reliable indicator of liquid level operable over wide temperature ranges requiring only a very simple circuit for detecting the voltage outputs. Moreover, the liquid level detection apparatus requires the liquid to be at the level of the sensors for only a short time upon sensor actuation to obtain a continuous indication of the initial liquid level.

The embodiment of the invention in which an exclusive property or privilege is claimed are defined as follows:

1. A liquid level detector for monitoring the presence of liquid in a container at a set level when the detector is energized comprising, first and second PTC resistors each of which are self-heating upon application of a current and having a switch point effecting a substantial resistance increase at a unique temperature above the maximum temperature of the liquid, at least the first of the PTC resistors being positioned at the said set level and the second being positioned at the set level or in the air above the liquid, the first PTC resistor having a heat loss rate in air that is less than that of the second, and a heat loss rate in liquid that is greater than that of the second, so that when heating current is applied to the resistors, one will reach the switch point before the other depending on the liquid level, and a circuit including the PTC resistors in series and a voltage source for applying a current to the resistors and providing a voltage signal indicative of liquid level whereby the voltage signal assumes a high or low value depending on which of the resistors first switches to a high resistance.

2. A liquid level detector for monitoring the presence of liquid in a container at a set level when the detector is energized comprising, first and second PTC resistors each of which are self-heating upon application of a current and having a switch point effecting a substantial resistance increase at a unique temperature above the maximum temperature of the liquid, at least the first of the PTC resistors being positioned at the said set level and the second being positioned at the set level or in the air above the liquid, the first PTC resistor having a heat loss rate in air that is less than that of the second, and a heat loss rate in liquid that is greater than that of the second, so that when heating current is applied to the resistors, one will reach the switch point before the other depending on the liquid level, a circuit coupling the PTC resistors in series across a DC voltage source, the junction point of the resistors providing a voltage signal whereby the voltage signal assumes a median value when the resistors are below the switch point and assumes a higher or lower value when one of the resistors switches to a high resistance, and means connected to the junction point and responsive to the voltage signal for providing an output indicative of at least one liquid level state.

3. A liquid level detector for monitoring the presence of liquid in a container at a set level when the detector is energized comprising, first and second PTC resistors each of which are self-heating upon application of a current and having a switch point effecting a substantial resistance increase at a unique temperature above the maximum temperature of the liquid, at least the first of the PTC resistors being positioned at the said set level and the second being positioned at the set level or in the air above the liquid, the first PTC resistor having a heat loss rate in air that is less than that of the second, and a heat loss rate in liquid that is greater than that of the second, so that when heating current is applied to the resistors, one will reach the switch point before the other depending on the liquid level, a detection and latch circuit coupling the PTC resistors in series across a DC voltage source to provide a heating current through the resistors, the junction point of the resistors providing a voltage signal whereby the voltage signal assumes a median value when the resistors are below the switch point and assumes a higher or lower value when one of the resistors first switches to a high resistance, the resistor value above the switch point being sufficiently high to limit the heating current to a value high enough to maintain the temperature of the switched resistor above the switch point and low enough to avoid heating the other resistor to its switch point so that the resistors maintain their respective switch status as long as the heating current is applied, and means connected to the junction point and responsive to the voltage signal for providing an output indicative of the liquid level state.

4. A liquid level detector for monitoring the presence of liquid in a container at a set level when the detector is energized comprising, first and second PTC resistors each of which are self-heating upon application of a current and having a switch point effecting a substantial resistance increase at a unique temperature above the maximum temperature of the liquid, the resistors having substantially the same nominal resistance value, mass and switch point, the first of the PTC resistors being positioned at the said set level and the second being positioned above the liquid, the first PTC resistor having a heat loss rate in air that is less than that of the second resistor in air, and a heat loss rate in liquid that is greater than that of the second resistor in air, so that when heating current is applied to the resistors and the first resistor is in liquid, the second resistor will reach the switch point before the first resistor, and when the first resistor is in air, the first resistor will reach the switch point before the second resistor, a circuit coupling the PTC resistors in series across a DC voltage source for applying heating current through the resistors, the junction point of the resistors providing a voltage signal whereby the voltage signal assumes a median value when the resistors are below the switch point, and assumes a higher or lower value when one of the resistors switches to a high resistance, so that if the second resistor switches to a high resistance to generate a resulting voltage signal when the first resistor is in liquid, the heating current is reduced to maintain the resulting voltage signal even if the liquid level subsequently recedes below the set level, and means connected to the junction point and responsive to the voltage signal for providing an output indicative of at least one of the liquid level states.

5. A liquid level detector for monitoring the presence of liquid in a container at a set level when the detector is energized comprising, first and second PTC resistors each of which are self-heating upon application of a current and having a switch point effecting a substantial resistance increase at a unique temperature above the maximum temperature of the liquid, the resistors having substantially the same nominal resistance value, mass and switch point, the PTC resistors being positioned at the same set level, the first PTC resistor having a heat loss rate in air that is less than that of the second, and a heat loss rate in liquid that is greater than that of the second, so that when heating current is applied to the resistors, the second will reach the switch point before the first when the liquid level is above the set level and the first will reach the switch point before the second when the liquid level is below the set level, a circuit coupling the PTC resistors in series across a DC voltage source for applying heating current through the resistors, the junction point of the resistors providing a voltage signal whereby upon initial energization the voltage signal assumes a median value when the resistors are below the switch point, and after heating the resistors assume a higher or lower value when one of the resistors switches to a high resistance, the increased value of either resistor being effective to regulate the heating current to a value adequate to maintain the resistors in their respective switch state irrespective of subsequent changes of liquid level, and means connected to the junction point and responsive to the voltage signal for providing an output indicative of at least one of the liquid level states.

6. A liquid level detector for monitoring the presence of liquid in a container at a set level when the detector is energized comprising, first and second PTC resistors each of which are self-heating upon application of a current and having a switch point effecting a substantial resistance increase at a unique temperature above the maximum temperature of the liquid, the resistors comprising pellets of PTC material with conductive leads attached thereto and having substantially equal nominal resistance values, masses and switch points, the resistors being shaped to have different surface areas and leads of different thermal conductivity to provide a differential in heat loss rate, at least the first of PTC resistors being positioned at the said set level and the second being positioned at the set level or in the air above the liquid, the first PTC resistor having a heat loss rate in air that is less than that of the second, and a heat loss rate in liquid that is greater than that of the second, so that when heating current is applied to the resistors, one will reach the switch point before the other depending on the liquid level, a circuit including the PTC resistors in series, a DC voltage source for applying a current to the resistors and providing a voltage signal whereby the voltage signal initially assumes a median value indicative of liquid level value when the resistors are below the switch point, and then assumes a higher or lower value depending on which of the resistors switches to a high resistance, and means connected to the junction point and responsive to the voltage signal for providing an output indicative of at least one liquid level state.

* * * * *